United States Patent [19]

Ogura et al.

[11] Patent Number: 5,798,080
[45] Date of Patent: Aug. 25, 1998

[54] METHOD OF PRODUCING A HOLLOW RESIN BODY AND APPARATUS THEREFOR

[75] Inventors: Mitsuo Ogura, Gifu; Hironao Tanaka, Aichi, both of Japan

[73] Assignee: Toyoda Gosei Co., Ltd., Aichi-ken, Japan

[21] Appl. No.: 617,225

[22] Filed: Mar. 18, 1996

[30] Foreign Application Priority Data

Mar. 30, 1995 [JP] Japan .................................. 7-099690

[51] Int. Cl.$^6$ .................................................. B29C 45/72
[52] U.S. Cl. ...................................... 264/572; 425/130
[58] Field of Search .............................. 264/572, 528; 425/130

[56] References Cited

U.S. PATENT DOCUMENTS

| | | | |
|---|---|---|---|
| 3,694,424 | 9/1972 | Hunkar et al. | 264/528 |
| 5,090,886 | 2/1992 | Jaroschek | 264/572 |
| 5,098,637 | 3/1992 | Hendry | 264/572 |
| 5,354,523 | 10/1994 | Shah | 264/572 |
| 5,607,640 | 3/1997 | Hendry | 264/572 |
| 5,612,067 | 3/1997 | Kurihara et al. | 264/572 |

FOREIGN PATENT DOCUMENTS

| | | | |
|---|---|---|---|
| 2109633 | 9/1972 | Germany | 264/572 |
| 3-274120 | 12/1991 | Japan | 264/572 |

*Primary Examiner*—Catherine Timm
*Attorney, Agent, or Firm*—Cushman Darby & Cushman Intellectual Property Group of Pillsbury, Madison & Sutro LLP

[57] ABSTRACT

After molten resin is injected into a mold cavity, an inert gas is sent from an inert gas supply device into the molten resin through a change-over valve and a gas nozzle device so that the molten resin is injection molded. At the same time, a tub is filled with part of the molten resin through a tub communication path. Thereafter, a burr portion of the injection-molded resin is bored using a boring punch so as to make a space within the hollow resin body communicate with the atmosphere. Next, the change-over valve is switched to send a cooling gas from a cooling gas supply device to the hollow space within the hollow resin body so as to cool the injection-molded resin.

10 Claims, 5 Drawing Sheets

METHOD OF PRODUCING A HOLLOW RESIN BODY AND APPARATUS THEREFOR

BACKGROUND OF THE INVENTION

1. Field of the Invention

The present invention relates to a method of producing a resin body having a hollow space, and to an apparatus for producing such a hollow resin body.

2. Description of Related Art

Conventionally, a technique for producing such a hollow resin body is disclosed, for example, in Japanese Patent Publication Hei. 6-28894. FIG. 6 is a diagram explaining such a conventional process. First, a resin molding apparatus for producing a hollow resin body, shown in FIG. 6, will be described.

A resin molding apparatus 200 is provided with a mold 204 having a cavity 202, a resin gate 208 for injecting molten resin into the cavity 202, a gas gate 210 formed substantially at the center of the cavity 202, and a gas supply device 220 for supplying an inert gas to the cavity 202, through the gas gate 210.

The resin molding apparatus 200 is further provided with a circulation cooling device 230 for rapidly cooling the inside of a hollow resin body R. That is, the circulation cooling device 230 is provided with chambers 234 formed on opposite end portions of the cavity 202 through cavity communication paths 232, and a circulator 236 connected between the chambers 234 and the gas supply device 220 so that the inert gas discharged from the chambers 234 is circulated to the gas supply device 220.

In the manufacturing process using the resin molding apparatus 200, molten resin is first injected into the cavity 202 of the mold 204 through the resin gate 208. Inert gas is supplied under pressure from the gas supply device 220 into the molten resin to inflate the molten resin, thereby forming the hollow resin body R which conforms with molding surface 204a of the mold 204. Next, by means of the circulation cooling device 230, the inert gas which has passed through hollow space Rs within the hollow resin body R is sent from the chambers 234 to the gas supply device 220 and then sent under pressure from the gas supply device 220 to the hollow space Rs of the hollow resin body R again. By such circulation of the inert gas, the resin hollow body R is cooled in a short time.

In the conventional resin molding device 200, however, the circulation cooling device 230 functions as a mechanism for circulating an inert gas to the gas supply device 220 under predetermined pressure. Therefore, the resin molding device 200 requires a compressor or the like and the overall device is therefore complicated in configuration and is large in size.

SUMMARY OF THE INVENTION

In order to solve the foregoing problem, it is an object of the present invention to provide a method of manufacturing a hollow resin body in which the hollow resin body is cooled in a short time with a simple apparatus, and to provide a manufacturing apparatus therefor.

According to a first aspect of the invention, a method of producing a hollow resin body is provided, comprising the steps of: preparing a mold having a cavity; injecting molten resin into the cavity; sending gas under pressure into the injected molten resin in the cavity so as to inflate the molten resin to thereby form a hollow space within the molten resin; forming a through hole in the hollow resin body so as to make the hollow space communicate with the atmosphere; and supplying cooling medium into the hollow space and discharging the cooling medium to the atmosphere through the through hole to cool the resin hollow body.

According to a second aspect of the invention, an apparatus for producing a hollow resin body is provided comprising: a mold having a cavity; a molten resin injecting device for injecting resin into the cavity of the mold; a gas supply for supplying a gas into the injected molten resin to form a hollow space in the molten resin, thereby forming a hollow resin body; a boring device for boring a through hole in a portion of the hollow resin body so as to make the hollow space communicate with the atmosphere; and a cooling medium supply for supplying the cooling medium into the hollow space.

According to the first aspect of the present invention, in the hollow resin body producing method, after a gas has been supplied into the molten resin to form a hollow resin body, a through hole is formed in the hollow resin body to communicate the hollow space with the atmosphere. Thereafter, a cooling medium is supplied to the hollow space. The cooling medium supplied to the hollow space is then discharged to the atmosphere through the through hole after cooling an interior portion of the hollow resin body. Since the cooling medium is discharged to the atmosphere after cooling the hollow resin body, the process of supplying the cooling medium is thus simplified.

The second aspect of the present invention relates to an apparatus for effectively producing the hollow resin body by is the method according to the foregoing first aspect. Molten resin is injected into the cavity of the mold by using the resin injection device. A gas is sent, under pressure, from the gas supply into the molten resin so as to form the hollow resin body. After the hollow resin body is formed, a through hole is formed in a portion of the hollow resin body by using the boring device. The through hole communicates the hollow space of the hollow resin body with the atmosphere. A cooling medium is then supplied from the cooling medium supply into the hollow space of the hollow resin body, and is discharged to the atmosphere through the through hole after cooling an interior wall surface of the hollow resin body facing the hollow space.

DETAILED DESCRIPTION OF THE PREFERRED EMBODIMENTS

Figure 1:
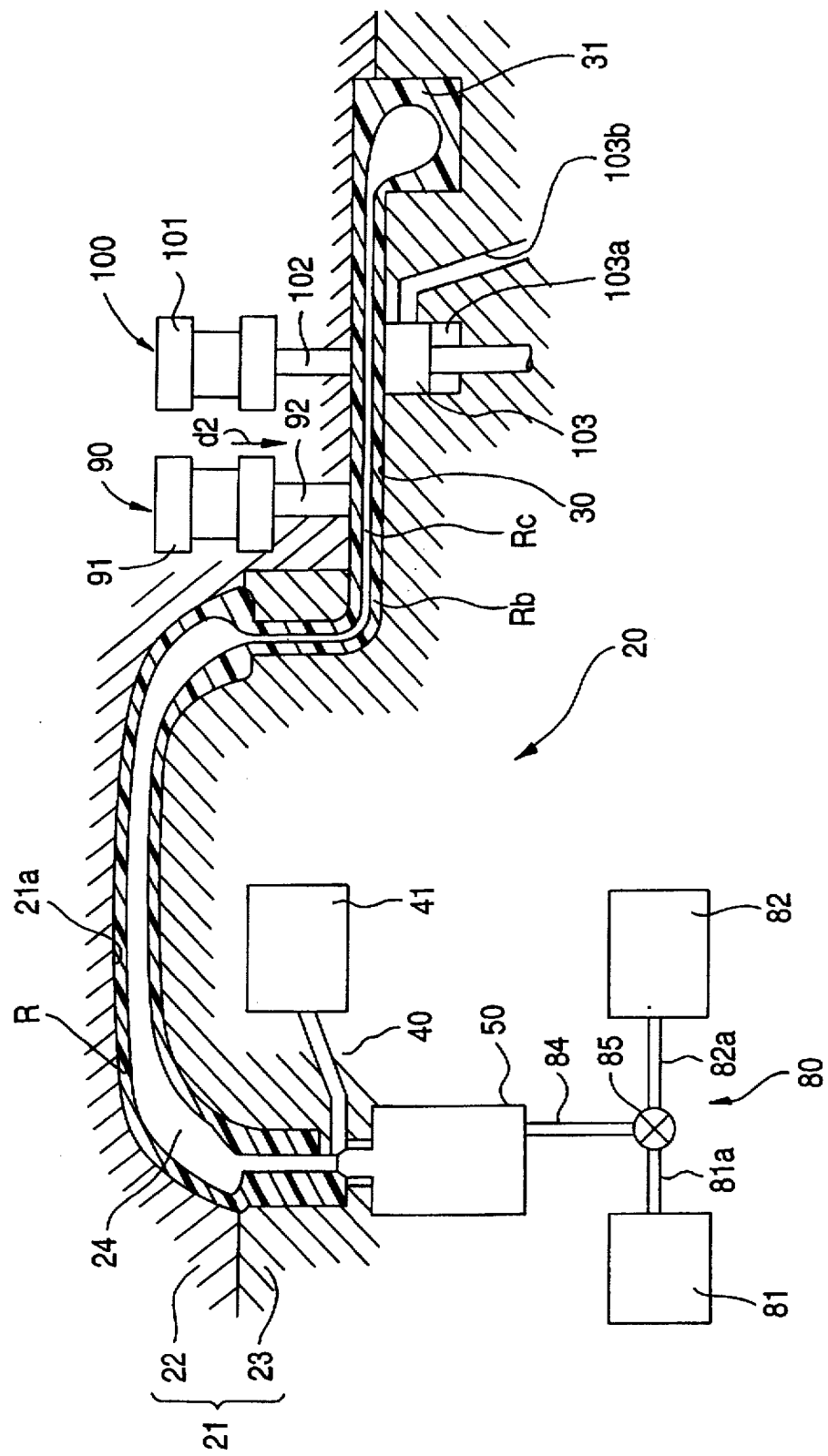
FIG. 1 is a diagram showing a resin molding apparatus according to an embodiment of the present invention.

FIG. 1 schematically illustrates a resin molding apparatus 20 for producing a hollow resin body according to an embodiment of the present invention. As shown in FIG. 1, the resin molding apparatus 20 comprises a mold 21. The mold 21 includes upper and lower molds 22 and 23, which define a cavity 24 formed between the upper and lower molds 22 and 23, in which a hollow resin body R is formed.

A tub communication path 30 is formed so as to communicate at one end with the cavity 24 of the mold 21. A tub 31 is connected to the other end of the tub communication path 30. The tub 31 is used to store molten resin discharged from the mold cavity 24.

Further, a resin gate 40 is provided at an end portion of the lower mold 23. The resin gate 40 is opened by a gate drive device 41 so as to lead molten resin injected from an injection molding device (not shown) into the cavity 24.

Figure 2:
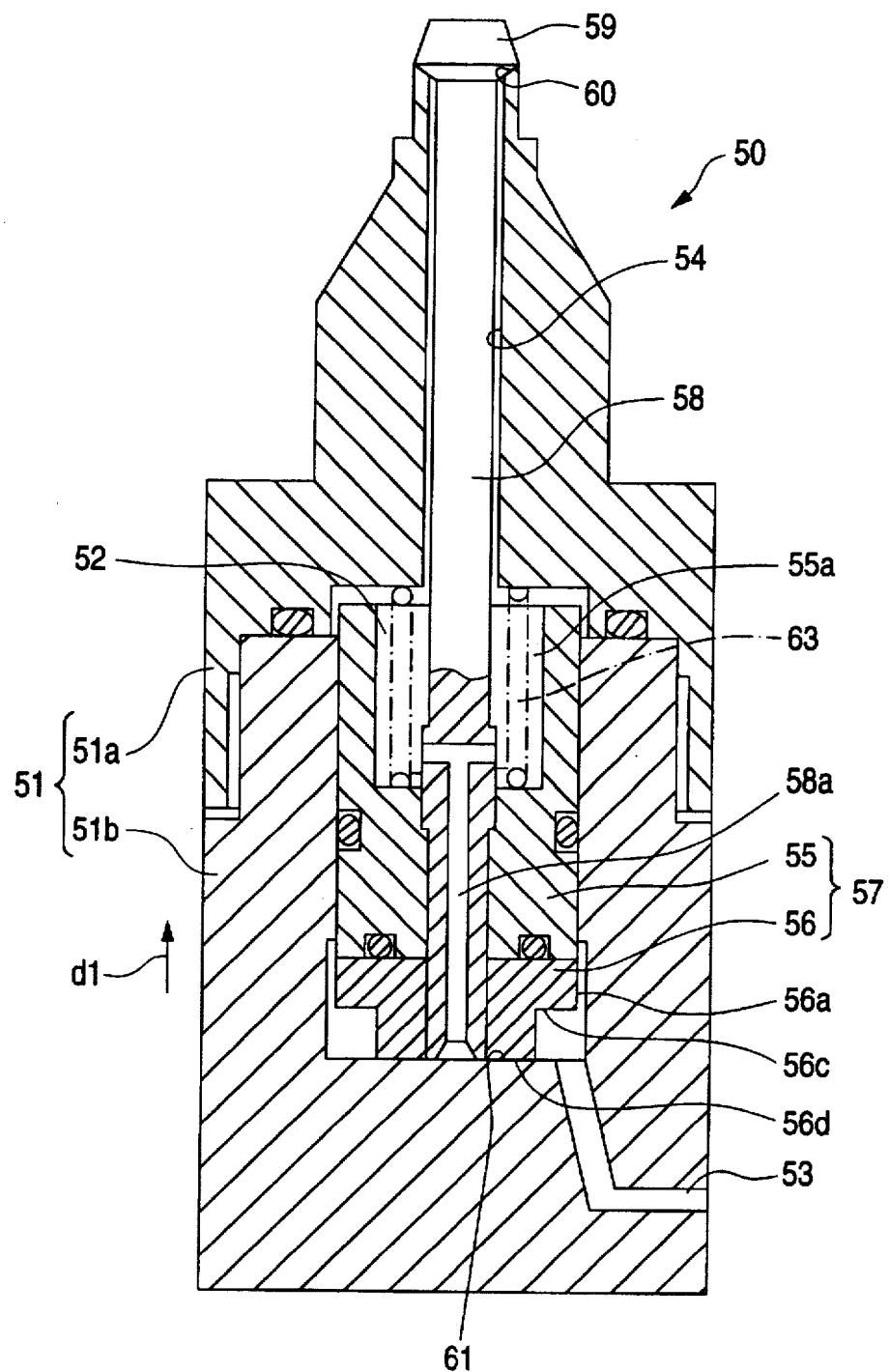
FIG. 2 is a cross section showing the closed-valve state of a gas nozzle device.
Figure 3:
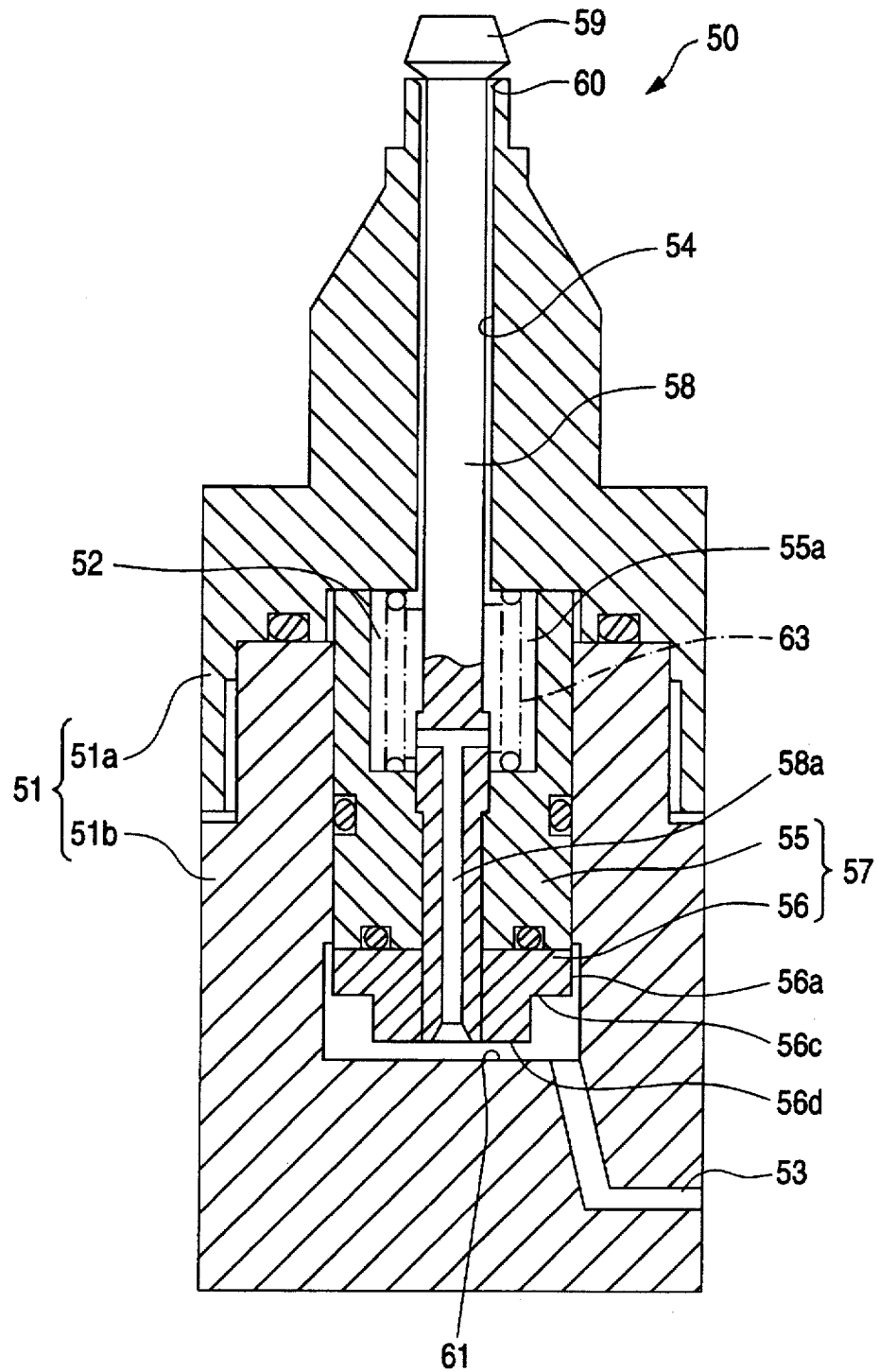
FIG. 3 is a cross section showing the opened-valve state of the gas nozzle device.

A gas nozzle device 50 (having a configuration such as shown in enlarged sectional views FIGS. 2 and 3) is provided adjacent to the resin gate 40 so as to supply/block an inert gas (nitrogen gas) or, for example, cooling gas (air, for example). Further, FIGS. 2 and 3 show valve-closed and valved-opened states, respectively. In FIGS. 2 and 3, the gas nozzle device 50 has a housing 51 comprising upper and lower housing portions 51a and 51b assembled to each other. A valve chamber 52 is formed in the housing 51. A lead-in path 53 is formed in a lower portion of the valve chamber 52, while an upper path 54 is formed in an upper portion of the valve chamber 52 so as to communicate with the cavity 24.

A valve body 57, comprising upper and lower valve bodies 55 and 56, assembled to each other, is slidably provided within the valve chamber 52. A rod 58 is fixed through the central portion of the valve body 57 and inserted in the upper path 54 with a predetermined gap therebetween. A cap portion 59 is provided on an end portion of the rod 58 and is designed so as to selectively open/close a flow-out opening 60 of the upper path 54. A valve rod flow path 58a is axially formed along the axial line of the lower portion of the rod 58 so as to communicate, at its end portion, with the valve chamber 52.

The lower portion of the lower valve body 56 has an annular step portion 56a. An outer peripheral surface of the annular step portion 56a serves as a pressure reception surface 56c, against which the pressure of a fluid from the lead-in path 53 is applied. The lower surface of the central part of lower valve body 56 is formed into a seat surface 56d. The seat surface 56d is provided so as to selectively contact lower seat surface 61 of the housing 51 so that a flow-in opening of the valve rod flow path 58a is opened/closed by the selective contact operation. A spring 63 is provided between upper valve recess portion 55a formed in the upper valve body 55 and the wall surface of the housing 51 so as to bias the valve body 57.

Next, the operation of the gas nozzle device 50 is described. When fluid pressure does not act on the pressure reception surface 56c of the lower valve body 56, the valve body 57 is seated on the lower seat surface 61 by the urging force of the spring 63. This closes the valve rod flow path 58a, and, at the same time, the cap portion 59 closes the flow-out opening 60.

When fluid pressure acts on the pressure reception surface 56c of the valve body 57, and when the pressure exceeds the urging force of the spring 63, the valve body 57 moves in the direction of an arrow d1 against the spring force of the spring 63. As a result, as shown in FIG. 3, the seat surface 56d of the lower valve body 56 is separated from the lower seat surface 61 to make the lead-in path 53 communicate with the valve rod flow path 58a. Also, the cap portion 59 of the rod 58 moves so as to open the flow-out opening 60. Therefore, fluid flows in from the lead-in path 53, passes through the valve rod flow path 58a and the upper path 54, and then flows out from the flow-out opening 60.

Returning to FIG. 1, gas supply device 80 is connected to the gas nozzle device 50 on the upstream side thereof. The gas supply device 80 is provided with an inert gas supply device 81 for supplying an inert gas, a cooling gas supply device 82 for supplying a cooling gas, a conduit line 81a connected to the inert gas supply device 81, a conduit line 82a connected to the cooling gas supply device 82, a change-over valve 85 provided at a junction between the conduit lines 81a and 82a, and a conduit line 84 connecting the change-over valve 85 and the gas nozzle device 50.

The change-over valve 85 has change-over positions such as an inert gas side position, a stoppage position, and a cooling side position. If the change-over valve 85 is switched to the inert gas side position, inert gas is supplied from the inert gas supply device 81 to the gas nozzle device 50. If the change-over valve 85 is switched to the cooling side position, cooling gas is supplied from the cooling gas supply device 82 to the gas nozzle device 50.

A shut-off device 90 is provided so as to closely face the tub communication path 30. The shut-off device 90 is provided with, for example, a hydraulic cylinder 91 and a shut-off pin 92 which is driven by the hydraulic cylinder 91 to advance/retreat so as to open/close the tub communication path 30.

A boring device 100 is also provided so as to closely face the tub communication path 30 on the downstream side of the shut-off device 90. The boring device 100 is provided with, for example, a hydraulic cylinder 101, a boring punch 102 driven by the hydraulic cylinder 101 to advance/retreat, and a piston 103 provided so as to face the boring punch 102 across the tub communication path 30. If the piston 103 is lowered so as to retreat into retreat space 103a from the wall surface of the tub communication path 30, the boring punch 102 can advance into the retreat space 103a when the hydraulic cylinder 101 is driven. The retreat space 103a is open to the atmosphere through path 103b.

Next, the process of producing the hollow resin body R using the resin molding apparatus 20 is described. First, a mold clamping device (not shown) is driven to clamp together the upper and lower molds 22 and 23. At this time, the change-over valve 85 is switched to the stoppage position. Next, the hydraulic cylinder 91 of the shut-off device 90 is driven to thereby move the shut-off pin 92 in the direction of an arrow d2 to close the tub communication path 30. This forms a sealed space in the cavity 24. Further, (at the same time, for example), as shown in FIG. 1, the boring punch 102 of the boring device 100 is retracted and the piston 103 is located in the advance (or forward) position so that the tub communication path 30 is open.

In this state, the gate drive device 41 is driven to open the resin gate 40 to thereby inject molten resin into the cavity 24 of the mold 21. Next, the change-over valve 85 is switched from the stoppage position to the inert gas side position so as to make the gas nozzle device 50 communicate with the inert gas supply device 81. As a result, inert gas is sent under pressure from the inert gas supply device 81 into the molten resin in the cavity 24 through the change-over valve 85 and the gas nozzle device 50. Thereafter, the hydraulic cylinder 91 of the shut-off device 90 is driven to retract the shut-off pin 92 and thereby open the tub communication path 30. As a result, the molten resin flows into the tub 31 through the tub communication path 30 so as to be stored therein. A hollow resin body R having a shape substantially conforming with molding surface 21a is thereby formed.

Figure 4:
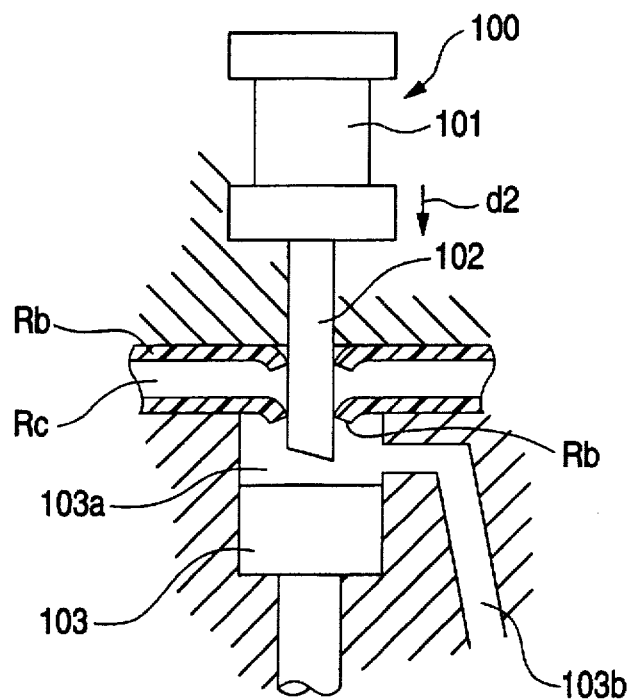
FIG. 4 is illustrates boring the hollow resin body with a boring device.
Figure 5:
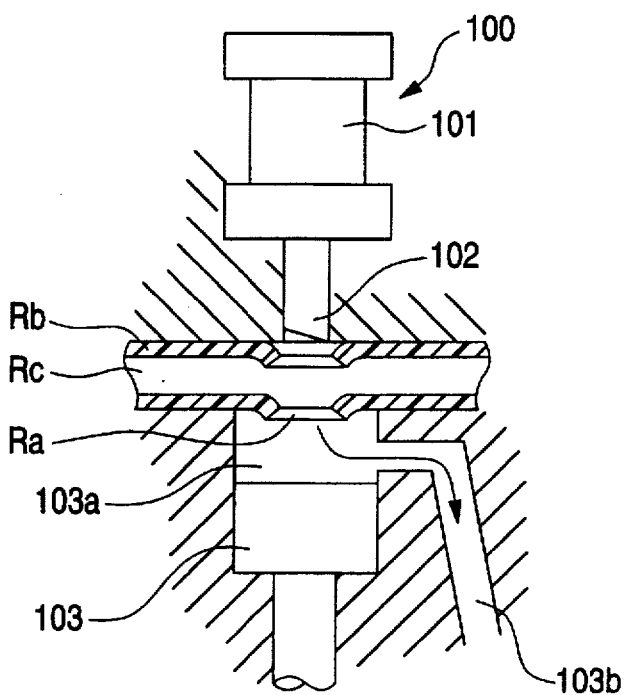
FIG. 5 illustrates the completion of boring, after the process shown in FIG. 4.
Figure 6:
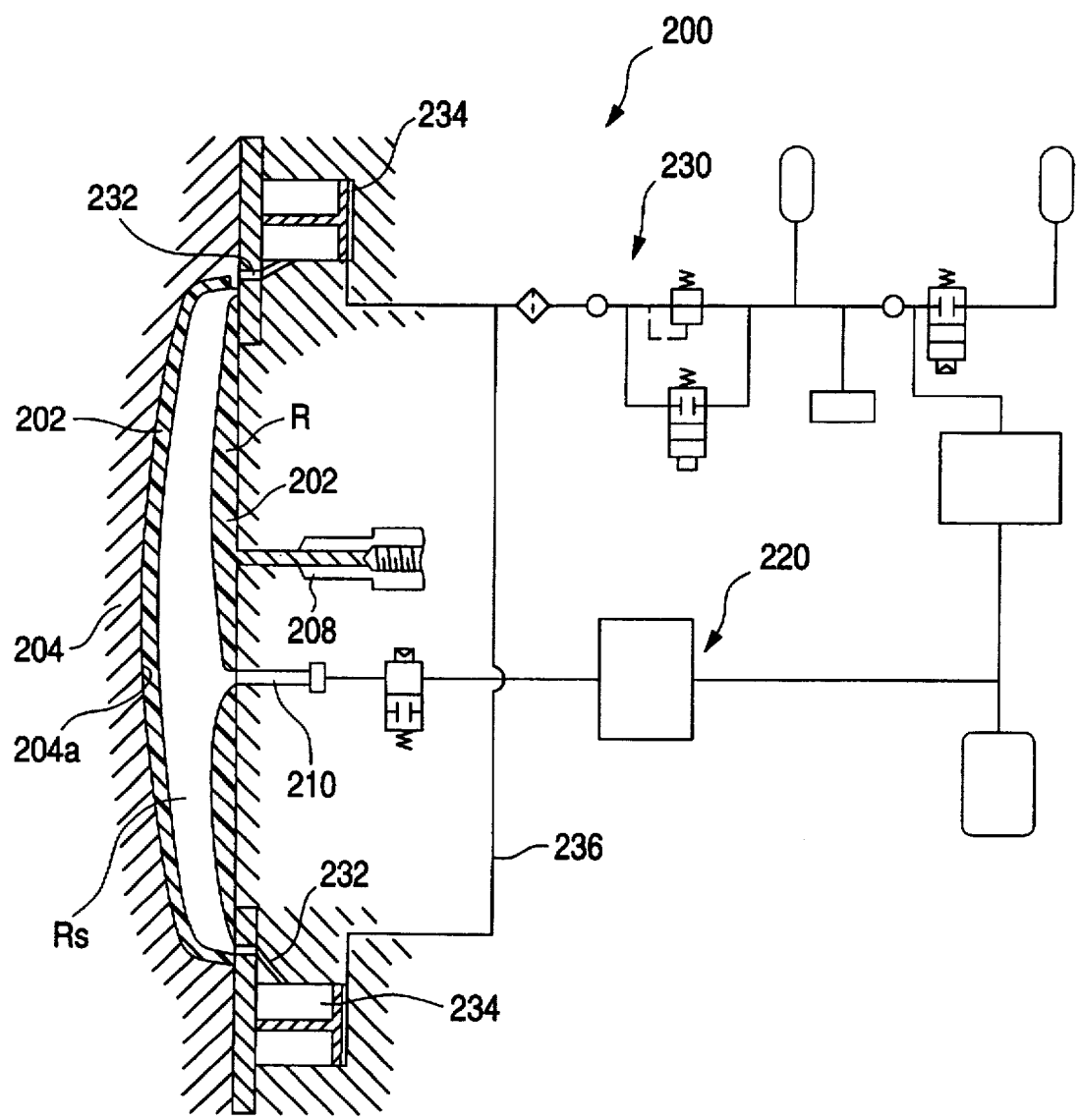
FIG. 6 is a diagram showing a conventional resin molding apparatus.

Thereafter, as shown in FIG. 4, piston 103 of the boring device 100 is moved downward, and the hydraulic cylinder 101 of the boring device 100 is driven to move the boring punch 102 in the direction of an arrow d2. Thus, a through hole Ra is formed in a burr portion Rb of the resin hollow body R by the front end portion of the boring punch 102. Next, the boring punch 102 is retracted as shown in FIG. 5. Since the through hole Ra makes the hollow space Rs of the hollow resin body R communicate with the atmosphere, the inert gas in the hollow space Rs is discharged to the atmosphere through path 103b, and the pressure in the hollow space Rs of the resin hollow body R decreases to atmospheric pressure.

Next, the change-over valve 85 is switched to the cooling side position, so that supply of the inert gas from the gas supply device 80 is stopped and cooling gas is injected from the cooling gas supply device 82 into the hollow space Rs. The cooling gas is passed through the hollow space Rs of the hollow resin body R to cool the hollow resin body R. The cooling gas from the hollow space Rs passes through the burr path Rc in the burr portion Rb and is discharged to the outside of the mold 21 through the through hole Ra. Then, after the hollow resin body R is cool, the mold is opened and the hollow resin body R is taken out. At that time, the burr portion Rb of the hollow resin body R is cut away, and any needed after-treatment is performed. Thus, the product is completed.

Accordingly, the hollow resin body R is cooled by the cooling gas after it is molded into a predetermined shape. This reduces the cooling time and improves productivity.

Further, according to the foregoing embodiment, after the inert gas has been sent under pressure into the molten resin charge to form the hollow resin body R, the through hole Ra is formed in the hollow resin body R to make the inside of the hollow resin body R communicate with the atmosphere. The hollow resin body R is then cooled by cooling gas. The cooling gas is discharged into the atmosphere after cooling the hollow resin body R, and is not used again. Accordingly, the circulation cooling device 230 for circulating a cooling medium, as described with respect to the related art, is not needed. The configuration of the apparatus can therefore be simplified.

Moreover, air may be used as the cooling gas. Since air is inexpensive compared with an inert gas, the production cost can advantageously be reduced.

Next, another embodiment will be described. In this embodiment, an atomized liquid-gas mixture, which is a mixture of a liquid and a gas, is used as the cooling medium. That is, is a cooling medium supply device for supplying a liquid, such as water, alcohol, or the like, as well as a gas such as air or the like, is used in place of the cooling gas supply device 82 shown in FIG. 1. When a liquid and a gas are supplied under pressure from the cooling medium supply device to the gas nozzle device 50 shown in FIGS. 2 and 3, the liquid and gas are mixed with each other in a narrow upper path 54. When the mixture is discharged from a flow-out opening 60, the mixture is changed into an atomized liquid-gas mixture by the Venturi effect. The atomized liquid-gas mixture is then injected into a hollow space of a hollow resin body. The cooling effect of the atomized liquid-gas mixture is superior to the use of gas alone. Further, the atomized liquid-gas mixture is preferably rapidly evaporated and removed by the heat of the resin, even if the liquid-gas mixture adheres to the inner wall surface of the hollow resin body. Therefore, unlike using a liquid alone, it is not necessary to perform troublesome steps to discharge the liquid from the hollow resin body. Moreover, using alcohol in the atomized liquid-gas mixture, such as isopropyl alcohol or the like, which has an excellent evaporative property, the effect can be further improved.

The present invention is not limited to the foregoing embodiments, but various modifications may be made without departing from the scope of the claims appended hereto. For example, the following modifications may be carried out.

(1) Although air or alcohol is used as the cooling medium in the foregoing embodiments, the present invention is not limited to these embodiments. Carbon dioxide, nitrogen gas, water or the like may also be used. In this case, if a liquid cooling medium is used, an improved cooling effect can be expected because a liquid generally has a greater heat capacity than a gas. It is also desirable to use a cooling medium which does not react with the resin material. If necessary, the cooling medium may be cooled so as to be lower than room temperature. When the cooling material is lower than room temperature, cooling time can be further reduced.

(2) Although the position for supplying the cooling medium into the hollow resin body is the same as the position for supplying the inert gas in the foregoing embodiments, the present invention is not limited to this. The cooling medium may be supplied from another position relative to the hollow resin body.

What is claimed is:

1. A method for manufacturing a hollow resinous body, comprising the steps of:

providing a mold having a molding cavity and a resin tub which is in communication with the molding cavity through a tub communication path;

closing off the tub communication path;

supplying molten resin into the molding cavity;

injecting a gas into the molten resin and opening the tub communication path so as to form a hollow space within the molten resin, thereby forming a hollow body;

forming a through hole in the hollow body such that the hollow space is opened;

supplying a mixture of an atomized liquid carried by a gas as a cooling medium into the hollow space to cool the hollow body; and discharging the cooling medium through the through hole.

2. The method according to claim 1, wherein said step of forming a hollow body includes forming a hollow burr portion extending between the molding cavity and the resin tub.

3. The method according to claim 2, wherein said step of forming a through hole comprises forming a through hole in the hollow burr portion.

4. The method according to claim 1, wherein the mold further includes a gas outlet path which communicates the molding cavity with an exterior of the mold, wherein said step of forming a through hole comprises forming a through hole at a location in the hollow body such that the through hole communicates an interior of the hollow body with the gas outlet path.

5. The method according to claim 1, wherein the forming of the through hole occurs downstream from where the tub communication path is closed off.

6. The method according to claim 1, further comprising a step of forming said mixture using a Venturi effect on pressurized supplies of said gas and said liquid.

7. The method according to claim 1, wherein said gas is air.

8. The method according to claim 1, wherein said liquid is selected from the group consisting of water and alcohol.

9. The method according to claim 1, wherein said liquid is isopropyl alcohol.

10. The method according to claim 1, wherein said liquid is a liquid which is evaporated by heat from said resin.

* * * * *